(12) United States Patent
Kesharaju et al.

(10) Patent No.: US 10,650,824 B1
(45) Date of Patent: May 12, 2020

(54) COMPUTER SYSTEMS AND METHODS FOR SECURING ACCESS TO CONTENT PROVIDED BY VIRTUAL ASSISTANTS

(71) Applicant: FMR LLC, Boston, MA (US)

(72) Inventors: Shanthan Kesharaju, Cary, NC (US); Pranab Mohanty, Westborough, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 16/409,261

(22) Filed: May 10, 2019

(51) Int. Cl.
| | |
|---|---|
| *G10L 17/00* | (2013.01) |
| *G10L 15/07* | (2013.01) |
| *G06F 21/32* | (2013.01) |
| *G10L 15/22* | (2006.01) |
| *G06F 21/62* | (2013.01) |
| *G10L 17/22* | (2013.01) |
| *G10L 17/18* | (2013.01) |

(52) U.S. Cl.
CPC .............. *G10L 17/00* (2013.01); *G06F 21/32* (2013.01); *G06F 21/6245* (2013.01); *G10L 15/075* (2013.01); *G10L 15/22* (2013.01); *G10L 17/005* (2013.01); *G10L 17/18* (2013.01); *G10L 17/22* (2013.01); *G10L 2015/223* (2013.01); *G10L 2015/225* (2013.01)

(58) Field of Classification Search
CPC ................................. G10L 17/32; G06F 21/32
USPC ......................................................... 704/246
See application file for complete search history.

(56) References Cited

U.S. PATENT DOCUMENTS

| | | | | |
|---|---|---|---|---|
| 6,219,639 | B1 * | 4/2001 | Bakis | G06K 9/00885 |
| | | | | 382/116 |
| 9,262,612 | B2 * | 2/2016 | Cheyer | G06F 21/32 |
| 10,419,221 | B1 * | 9/2019 | Streit | H04L 9/008 |
| 2009/0116703 | A1 | 5/2009 | Schultz | |
| 2010/0110374 | A1 * | 5/2010 | Raguin | G06K 9/0061 |
| | | | | 351/206 |

(Continued)

OTHER PUBLICATIONS

"Human Identification using Face and Voice Recognition" by Jadhav et al, (IJCSIT) International Journal of Computer Science and Information Technologies, vol. 2 (3) , 2011, 1248-1252. See http://ijcsit.com/docs/Volume%202/vol2issue3/ijcsit2011020355.pdf.

(Continued)

*Primary Examiner* — Shaun Roberts
(74) *Attorney, Agent, or Firm* — Proskauer Rose LLP

(57) ABSTRACT

A computerized method of authenticating a user includes receiving, by a computing device, first biometric data from the user via a first biometric input device; extracting one or more first features from the first biometric data; generating a first vector based on the first features; computing a first similarity score reflecting a geometric distance between the first vector and a first reference vector stored in memory; receiving second biometric data from the user via a second biometric input device; extracting one or more second features from the second biometric data; generating a second vector based on the second features; computing a second similarity score reflecting a geometric distance between the second vector and a second reference vector stored in memory; computing a confidence score based on the first and second similarity scores; and determining a right of the user to access restricted information based on the confidence score.

25 Claims, 7 Drawing Sheets

(56) References Cited

U.S. PATENT DOCUMENTS

| | | | |
|---|---|---|---|
| 2010/0272325 A1* | 10/2010 | Veldhuis | G06K 9/38 |
| | | | 382/115 |
| 2011/0142234 A1* | 6/2011 | Rogers | G06F 21/35 |
| | | | 380/247 |
| 2013/0227678 A1 | 8/2013 | Kang et al. | |
| 2013/0262873 A1* | 10/2013 | Read | H04W 12/06 |
| | | | 713/186 |
| 2015/0088625 A1* | 3/2015 | Eronen | G06K 9/00295 |
| | | | 705/14.16 |
| 2015/0379253 A1 | 12/2015 | Cook et al. | |
| 2016/0118050 A1* | 4/2016 | Arslan | G10L 17/26 |
| | | | 704/235 |
| 2016/0148039 A1* | 5/2016 | Potash | G06K 9/00885 |
| | | | 382/119 |
| 2016/0372110 A1* | 12/2016 | Waltermann | G10L 15/22 |
| 2018/0121714 A1* | 5/2018 | Liang | G06K 9/00 |
| 2019/0141190 A1* | 5/2019 | Gupta | H04M 3/493 |
| 2019/0156003 A1* | 5/2019 | Alameh | G06F 21/32 |

OTHER PUBLICATIONS

"Multimodal biometric authentication based on voice, face and iris," by T. Barbu, A. Ciobanu and M. Luca, 2015 E-Health and Bioengineering Conference (EHB), Iasi, 2015, pp. 1-4. See: http://ieeexplore.ieee.org/stamp/stamp.jsp?tp=&arnumber=7391373&isnumber=7391343.

\* cited by examiner

COMPUTER SYSTEMS AND METHODS FOR SECURING ACCESS TO CONTENT PROVIDED BY VIRTUAL ASSISTANTS

TECHNICAL FIELD

This application relates generally to systems, methods and apparatuses, including computer programs, for securing access to sensitive content provided by virtual assistants. More specifically, this application relates to using multiple biometrics to verify a user's identity before providing the user access to sensitive content via virtual assistant.

BACKGROUND

The advent of virtual assistants has caused a steady increase in the number of customers using voice as a primary medium to interact with organizations. One challenge that organizations constantly face is how to efficiently and effectively validate the identity of a user talking to the virtual assistant. Prior solutions have hinged on analyzing a user's voice, extracting a voice print and comparing it to a stored sample. However, in many scenarios, this approach may not be sufficient to prevent a malicious user from circumventing the system, e.g., by playing a voice recording of the victim to gain access to the system. As a result, voice-enabled applications are often limited to providing public information that does not require authenticating the user, for example stock quotes and news headlines.

With increased usage of voice-enabled digital assistants, it would be desirable for financial transactions to be executed through voice commands from the user's living room. Such interactions would not only be very convenient for a single user, but would enable the voice enabled digital assistant to interact with multiple users, e.g., as part of a planning session occurring in real time conversation. However, from the standpoint of an organization handling sensitive data (e.g., a financial institution), such zero-user interface ("zero-UI") interaction requires robust authentication, extremely secure channels of communication, and effective threat and fraud prevention mechanisms. Biometrics provide one of the most accurate, robust and scalable authentication mechanisms, offering at least the following advantages: (i) they are unique to specific people; (ii) they are static or substantially static over time; (iii) they do not need to be remembered; (iv) they can be collected non-intrusively (e.g., reading a face print, fingerprint, or iris print; recording a voice print; etc.).

SUMMARY

Accordingly, the invention provides a novel framework, including a computing system and associated computing methods and modules, for increasing security of sensitive content accessed via virtual assistant. In particular, the invention receives multiple types of biometric input (e.g., a facial image detected by a camera and a voice sample detected by a microphone) to verify a user and decrease the chance that a malicious user can circumvent the system. The invention can be implemented on traditional devices such as laptops and mobile phones and can utilize the standard hardware (e.g., cameras or microphones) built into those devices.

Each user request passing between the virtual assistant and the voice application can be intercepted by an identity filter (e.g., a module within an identity manager), which analyzes the biometric (e.g., voice and visual) samples provided by the user via detection algorithms and generates a unique voiceID and visualID for the user. The identity filter then populates the user request with a userID unique to the user and passes it to the downstream voice application that serves the request. When the user starts a new session with the voice application, the voice application retrieves the userID from the request and stores it in the session. The voice application then validates the user identity for every subsequent request made within the same session. In the event that a malicious user tries to gain control of an unattended virtual assistant and continues an authenticated session, the identity filter detects a new user and either populates the request with a new userID (if the malicious user is registered) or passes no request at all (if the malicious user is unregistered). Before each request is fulfilled, the voice application checks the validity of the user by comparing the information of the user in the session and that associated with the request, and invalidates the session if there is a discrepancy.

Thus, the voice application is able to protect the user from unwanted attacks to a higher degree of certainty than prior solutions have provided. In some embodiments, non-transactional information (e.g., unsecured or low security information, such as public stock quotes or news) can be accessed using a single layer of authentication (e.g., voice recognition only), while secure transactions (e.g., placing a stock order) can be accessed only using multi-modal non-invasive biometric authentication (e.g., voice and facial recognition). In some embodiments, fraudulent transactions made under distress or threat can be preempted, e.g., by using stress detection technology based on a voice analysis or emotion detection technology based on a facial analysis. In some embodiments, stress and fraud indicators can be authenticated and analyzed at multiple points during the length of the customer transaction (e.g., periodically or continuously).

One of ordinary skill in the art will readily appreciate that, although systems and methods making use one or two biometric inputs are discussed herein, such systems and methods may also function using a series or sequence of biometric templates for authentication layers. Generally, the systems and methods discussed herein may be adaptive and can use any biometric-based authentication mechanism as a plug-in. For example, based on user preferences, the system might either continuously collect available biometric templates for continuous authentication or periodically request customers to provide specific biometrics for multi-modal authentication.

In one aspect, the invention features a computerized method of authenticating a user. The method includes receiving, by a computing device, first biometric data from the user via a first biometric input device in electronic communication with the computing device. The method also includes extracting, by the computing device, one or more first features from the first biometric data. The method also includes generating, by the computing device, a first vector based on the first features. The method also includes computing, by the computing device, a first similarity score reflecting a geometric distance between the first vector and a first reference vector stored in memory of the computing device. The method also includes receiving, by the computing device, second biometric data from the user via a second biometric input device in electronic communication with the computing device. The method also includes extracting, by the computing device, one or more second features from the second biometric data. The method also includes generating, by the computing device, a second vector based on the second features. The method also includes computing, by the computing device, a second similarity score reflecting a geometric distance between the second vector and a second reference vector stored in memory of the computing device. The method also includes computing, by the computing device, a confidence score based on the first and second similarity scores. The method also includes determining, by the computing device, a right of the user to access restricted information based on the confidence score.

In some embodiments, the first biometric input device is a microphone configured to receive voice input from the user. In some embodiments, the second biometric input device is a camera configured to receive facial image input from the user. In some embodiments, the method further includes monitoring, by the computing device, a stress indication of the user based on the first biometric data at one or more points in time. In some embodiments, the method further includes denying, by the computing device, access to the restricted information if the stress indication exceeds a specified stress threshold. In some embodiments, the monitoring occurs periodically or continuously throughout a user interaction. In some embodiments, the method further includes monitoring, by the computing device, an emotional indication of the user based on the second biometric data at one or more points in time. In some embodiments, the method further includes denying, by the computing device, access to the restricted information if the emotional indication exceeds a specified emotion threshold. In some embodiments, the monitoring occurs periodically or continuously throughout user interaction.

In some embodiments, computing at least one of the first similarity score or the second similarity score includes using at least one of a supervised learning model and/or a neural network. In some embodiments, the first and second reference vectors are stored in a user profile, the user profile included in an identity manager module of the computing device that interfaces with a virtual assistant for receiving a request from the user and a voice application for serving the request after the user is authenticated. In some embodiments, the voice application authenticates the user for each request received during a computing session.

In another aspect, the invention features a computing system for authenticating a user. The computing system includes a computing device having a processor and a memory. The computing system also includes a first biometric input device in electronic communication with the computing device. The computing system also includes a second biometric input device in electronic communication with the computing device. The computing device is configured to: receive first biometric data from the user via the first biometric input device; extract one or more first features from the first biometric data; generate a first vector based on the first features; compute a first similarity score reflecting a geometric distance between the first vector and a first reference vector stored in the memory of the computing device; receive second biometric data from the user via the second biometric input device; extract one or more second features from the second biometric data; generate a second vector based on the second features; compute a second similarity score reflecting a geometric distance between the second vector and a second reference vector stored in memory of the computing device; compute a confidence score based on the first and second similarity scores; and determine a right of the user to access restricted information based on the confidence score. In some embodiments, the first biometric input device is a microphone. In some embodiments, the second biometric input device is a camera.

In some embodiments, the computing device is one of a smartphone, tablet, or personal computer.

In another aspect, the invention features a computerized method of training a computing device to recognize a user. The method includes generating, by the computing device, a device profile for the user, the device profile stored in memory of the computing device and including a device identifier and a user profile identifier. The method also includes receiving, by a computing device, first reference biometric data from the user via a first biometric input device in electronic communication with the computing device. The method also includes extracting, by the computing device, one or more first reference features from the first reference biometric data. The method also includes generating, by the computing device, a first reference vector based on the first reference features. The method also includes storing, by the computing device, the first reference vector in a memory section of the computing device associated with the device profile. The method also includes receiving, by the computing device, second reference biometric data from the user via a second biometric input device in electronic communication with the computing device. The method also includes extracting, by the computing device, one or more second reference features from the second reference biometric data. The method also includes generating, by the computing device, a second reference vector based on the second reference features. The method also includes storing, by the computing device, the second reference vector in a memory section of the computing device associated with the device profile.

In some embodiments, the first reference biometric data includes one or more pass phrases or answers to secret questions spoken by the user. In some embodiments, the first reference features include Cepstral, Cepstral-extended, phonetics, and prosodic features based on a frequency domain translation of the first reference biometric data. In some embodiments, the first reference vector is generated using a dynamic time warping encoding model or a Gaussian mixture model. In some embodiments, the second reference biometric data includes one or more facial images of the user. In some embodiments, the second reference features include numerical values based on facial attributes. In some embodiments, the second reference vector is generated using a deep neural network.

In another aspect, the invention features a computerized method of authenticating a user. The method includes (i) responsive to receiving a user request to access non-restricted information: receiving, by a computing device, first biometric data from the user via a first biometric input device in electronic communication with the computing device; extracting, by the computing device, one or more first features from the first biometric data; generating, by the computing device, a first vector based on the first features; computing, by the computing device, a first similarity score reflecting a geometric distance between the first vector and a first reference vector stored in memory of the computing device; and determining, by the computing device, a right to access the non-transactional information based on the similarity score. The method also includes (ii) responsive to receiving a user request to access restricted information, completing all of the steps of (i) and further: receiving, by the computing device, second biometric data from the user via a second biometric input device in electronic communication with the computing device; extracting, by the computing device, one or more second features from the second biometric data; generating, by the computing device, a second vector based on the second features; computing, by the computing device, a second similarity score reflecting a geometric distance between the second vector and a second reference vector stored in memory of the computing device; determining, by the computing device, a confidence score based on the first and second similarity scores; and determining, by the computing device, a right to access the restricted information based on the confidence score. In some embodiments, responsive to receiving a user request to access non-restricted information, the computing device determines a category of the user without determining a precise identity of the user.

BRIEF DESCRIPTION OF THE DRAWINGS

The advantages of the invention described above, together with further advantages, may be better understood by referring to the following description taken in conjunction with the accompanying drawings. The drawings are not necessarily to scale; emphasis is instead generally placed upon illustrating the principles of the invention.

DETAILED DESCRIPTION

Figure 1:
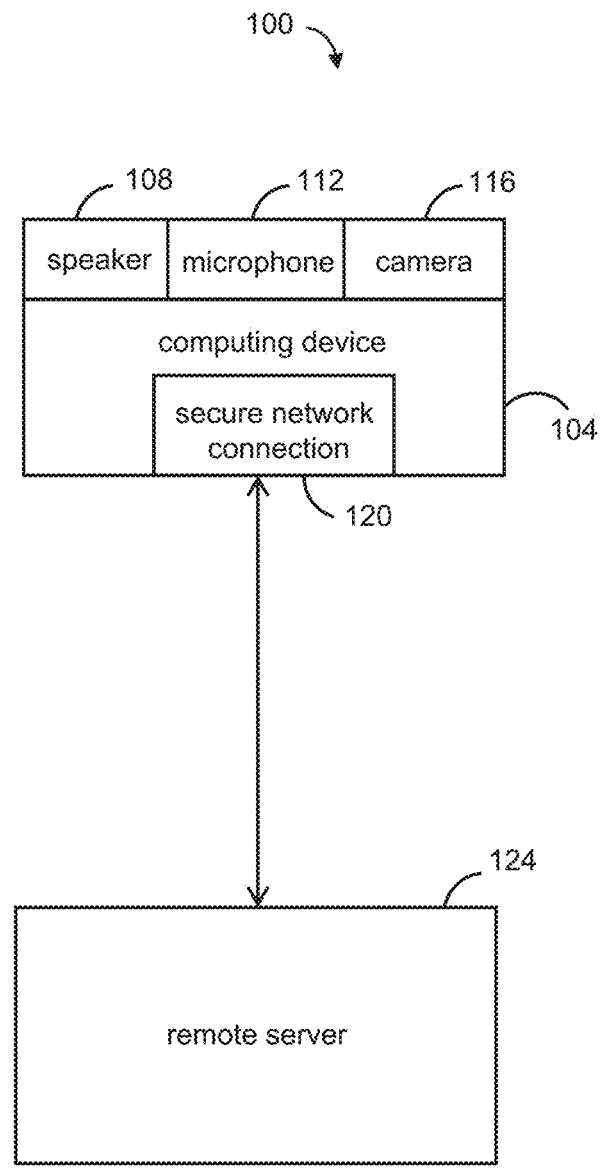
FIG. 1 is a schematic diagram of a computing system for authenticating a user, according to an illustrative embodiment of the invention.

FIG. 1 is a schematic diagram of a computing system 100 for authenticating a user, according to an illustrative embodiment of the invention. The computing system 100 includes a computing device 104 having a speaker 108, a microphone 112, a camera 116, and a secure network connection 120. The computing device 104 can include an integrated system having an operating system (e.g., Android, iOS, or Windows) and controlling drivers for the speaker 108, microphone 112, and camera 116. Alternatively or in addition, the computing device 104 can be integrated with off-the-shelf voice-enabled systems such as Amazon Alexa, Google Home, Apple Siri, or Microsoft Cortana. In some cases, the computing device 104 does not have any visual user interface and interacts with the user purely through voice. The computing device 104 can be in communication with a remote sever 124 over the secure network connection 120 (which can be, e.g., a LAN, WAN, WiFi, or Bluetooth connection). The remote server 124 can be responsible for performing one or more of the authentication operations described in greater detail below and communicating the results to the computing device 104.

Figure 2:
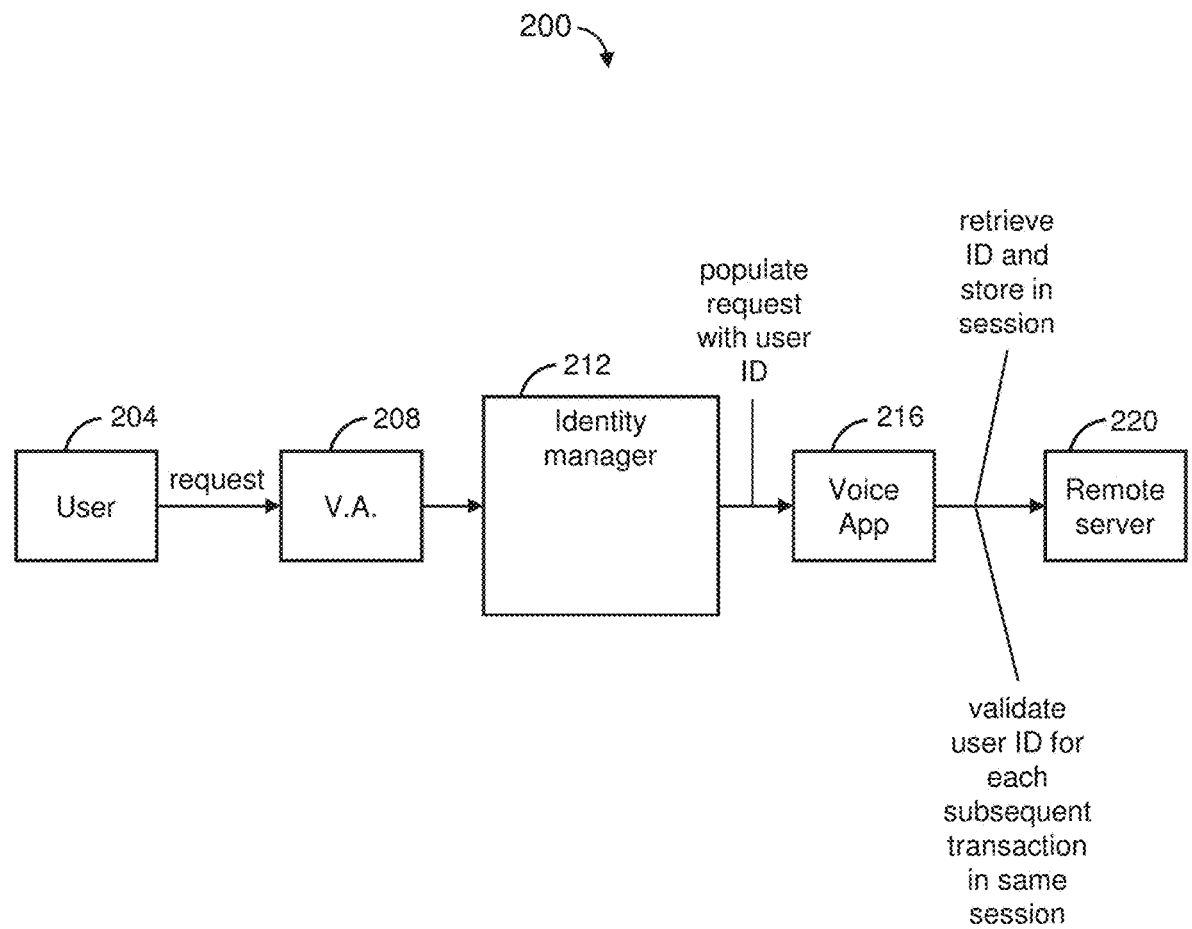
FIG. 2 is a schematic diagram of a process of using an identity manager to authenticate a user, according to an illustrative embodiment of the invention.

FIG. 2 is a schematic diagram 200 of a process of using an identity manager 212 to authenticate a user 204, according to an illustrative embodiment of the invention. In this setup, the user 204 makes a request to a virtual assistant 208, which can be operating on the computing device 104 shown and described above in connection with FIG. 1. The request may contain one or more biometric samples of the user 204 (e.g., a voice sample and a visual sample of the user 204). Each request between the virtual assistant 208 and the voice application 216 is intercepted by the identify manager 212, which analyzes the voice and visual samples using detection algorithms known in the art and generates a unique voiceID and visualID for the user 204. The identity manager 212 populates the request with the userID and passes it to the voice application 216, which serves the request to the remote server 220 (e.g., the remote server 124 shown and described above in connection with FIG. 1). The identity manager 212 can utilize temporary storage for voice and visual artifacts made with each request, and can compare them to known samples stored in memory of the computing device.

When the user 204 starts a new session with the voice application 216, the voice application 216 retrieves the userID from the request and stores it in the session. The voice application 216 can validate the user identity for multiple requests within the same session, e.g., for each and every subsequent request within the same session. Thus, if a malicious user tries to gain control of the virtual assistant 208 and continue an authenticated session, the identity manager 212 will detect a new user and populate the request with a new userID (if the malicious user is registered) or nothing (if the malicious user is unregistered). Before each user request, the voice application 216 can check the validity of the user 204 by comparing the user in the session with that of the request, and can invalidate the session if there is a discrepancy. Thus, the voice application protects the user and maintains the integrity of the system.

Figure 3:
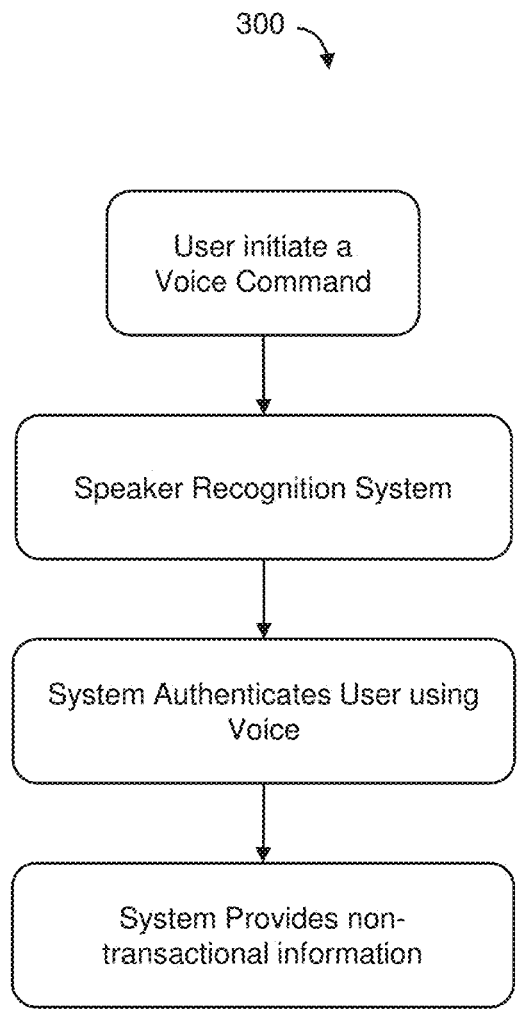
FIG. 3 is a flow diagram illustrating a request for non-sensitive information made to a computing system for authenticating a user, according to an illustrative embodiment of the invention.

FIG. 3 is a flow diagram 300 illustrating a request for non-sensitive information made to a computing system for authenticating a user, according to an illustrative embodiment of the invention. First, a user initiates a voice command. Second, a speaker recognition system differentiates between different household profiles (e.g., kids, adults, elders, etc.) and provides contextual, personalized responses but does not perform a robust identification on an individual basis. Existing off-the-shelf technologies (e.g., Alexa or Siri) may be used for this purpose. Third, the system authenticates the user based on the user's voice print only. Fourth, presuming a successful authentication, the user provides information of a non-sensitive nature, such as publicly available stock information or news stories.

Figure 4:
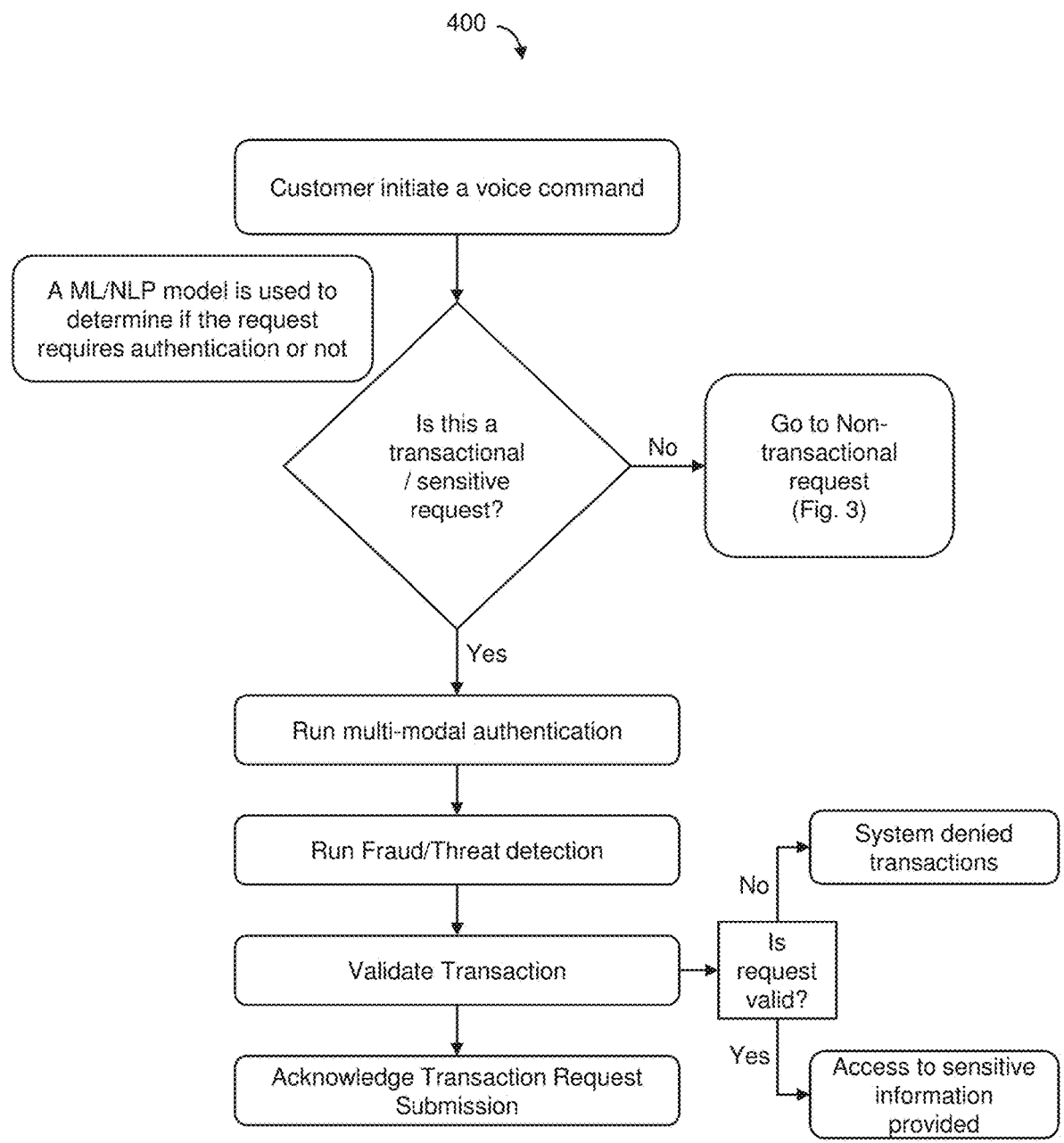
FIG. 4 is a flow diagram illustrating a request for sensitive information made to a computing system for authenticating a user, according to an illustrative embodiment of the invention.

FIG. 4 is a flow diagram 400 illustrating a request for sensitive information made to a computing system for authenticating a user, according to an illustrative embodiment of the invention. For secure transactional requests, the system can use the multi-layer, multi-modal biometric authentication process described above to confirm that the transaction requests originated from a registered user. In order to authenticate the user, the system uses multiple biometric prints (e.g., both voice and face biometrics). Each of these biometrics, with recent advances in each technology, has been proven to be robust and reliable on its own. When combined as a multi-modal biometric authentication system the accuracy and reliability of the system amplifies multi-fold. In some embodiments, the system can be further tuned with a confidence score to achieve near 100% precision. In such embodiments, the system can be tuned not to accept any false identification (for high accuracy) even if at times system may reject an authenticated user (at the cost of some inconvenience).

Before use, a multi-modal enrollment procedure is required for each user. In one embodiment, when a user opts into a zero-UI transaction processing system, the system prompts the user to enroll with one passphrase. Passphrases are different from passwords in that they are spoken and can be any common phrase or user-selected sentence (e.g., my address is 123 Main Street in New York, N.Y.). The voice print is stored in a user registration profile. During the authentication process, the user speaks the same sentence or phrase. Alternatively, for a more secure process, the system can ask the user one or two secret questions as a key phrase for multi-factor authentication. This process is known as text-dependent speaker verification. From the device signature, IP address, and passphrase/key phrase, the user can be identified, and then text-dependent speaker verification can be used to verify the user's identity.

The details of the text-dependent speaker verification process are as follows. During the enrollment process, the customer is requested to speak one or two passphrases multiple times. Alternatively, the customer can be asked to select three secret questions and speak the answers to those questions. The speech can be captured by a microphone and stored in memory as a wave form or another audio format. The speech can then be translated into a frequency domain, and several features used to distinguish one person from another can be extracted, e.g., Cepstral, Cepstral-extended, phonetics and prosodic features. In some embodiments, text-conditioned GMMS, phone HMMs, phone n-grams, word conditioned n-gram and/or inter-pause variations can be used to enumerate the features. Then several encoding methods (e.g., DTW model, GMM models) can be performed to derive a compact representation of these features in a multi-dimensional vector space in a secured database.

During speaker verification, the user can be requested to speak the same passphrase or answer the secret questions, and similar feature vectors can be extracted. Then, the newly generated feature vector can be compared with the feature vector stored in the secured database. An ensemble model of SVM and neural networks can be used to verify whether there is a match. The model outputs a similarity score, which is then used to verify the speaker (e.g., a score at or above a certain threshold constitutes a match, whereas a score below the threshold does not).

A similar process can be used to authenticate the user using facial recognition based authentication. The customer can be requested to provide facial images by looking at the camera (e.g., a webcam or integrated camera). Several face images of the user can be captured, and facial attributes can be detected (e.g., features related to the user's eyes, nose, mouth, shape and skin texture). These features can then be translated into numerical values based on geometrical values (e.g., inter-eye distance, nose-eye triangulation, skin texture, etc.). An encoding process can then be used to represent the user's facial signature in a compact form.

Then, during the user verification process, the user's face can be captured, and the face detection module can be run, extracting similar features from a facial image of the user and running a deep neural network model to verify the customer. The model can output a similarity score between the set of newly captured facial image features and the feature set stored in our database. The similarity score can then be used to verify the user. Finally, the similarity scores provided by the facial and the voice authentication can be combined (e.g., using another neural network) to produce a confidence measure, which can be used to verify and authenticate the user.

In some embodiments, even if the user is authenticated, there exists a possibility of the transaction being requested under threat or stress. With advanced machine learning technology, such transactions can be identified and prevented as well, e.g., by using stress detection technology performed on user utterances and scene analysis performed on the user's face to detect whether the transaction is being requested in a safe and friendly environment. In some embodiments, stress detection is performed by analyzing a customer's voice or facial expression. A voice analyzer can be used to create a profile of a customer's face and voice, such that a spectrum of a customer's neutral speech and expressions are represented. When a sensitive transaction is requested by the customer, the current face and voice profile is captured and matched with the spectrum of neutral speech and neutral expression to detect any level of stress.

In some embodiments, the following pseudo-code can be used to establish one or more of the above-described methods:

Step 1: A user trains the system with his or her voice and face prints to establish identity The user creates a new device profile on the device and registers his or her voice and visual profile. The following commands may be used:

```
registerVoice(deviceId, userProfileID)
    audio=captureVoiceFromMic( )
    voiceProfileID=generateVoiceProfileID(audio)
    storeVoiceProfileIDInMasterRepository(deviceID, userProfileID, voiceProfileID) registerFace(deviceId, userProfileID)
    face=captureVisualFromCamera( )
    faceProfileID=generateFaceProfileID(face)
    storeFaceProfileIDInMasterRepository(deviceID, userProfileID, faceProfileID)
```

Optionally, as part of Step 1, the user's neutral face and speech profile may be collected for stress and threat detection. The following commands may be used:

```
captureNeutralVoice (deviceID, userProfileID)
neutralVoiceSpectrum=empty_list( )
do
    audio=captureVoiceFromMic( )
    neutralProfile=CreateNeutralVoiceProfile(audio)
    neutralVoiceSpectrum.add(neutralProfile)
repeat until N variations of neutral Profile is captured
captureNeutralFacialExpression(deviceID, userProfileID)
neutralFaceExpression=empty_list( )
do
    face=captureVisualFromCamera( )
    expression=detectExpression(face)
    if (expression is not equal {fear, sad, confuse})
    neutralFaceExpression.add(expression)
repeat until N neutral expression is captured
storeNeutralProfileInMasterRepository(deviceId, userProfileID, neutralVoiceSpectrum, neutralFaceExpression)
```

Step 2: The user grants permission to the device maker to share the voice and visual profile with the voice application. The following commands may be used:

```
grantPermissionToShareProfileWithApplication(applicationID)
    deviceID=retrieveCurrentDeviceID( )
    userProfileID=retrieveCurrentUserProfileID( )
    storeConsentToShareWithApplication(deviceID, userProfileID, applicationID)
```

Figure 5:
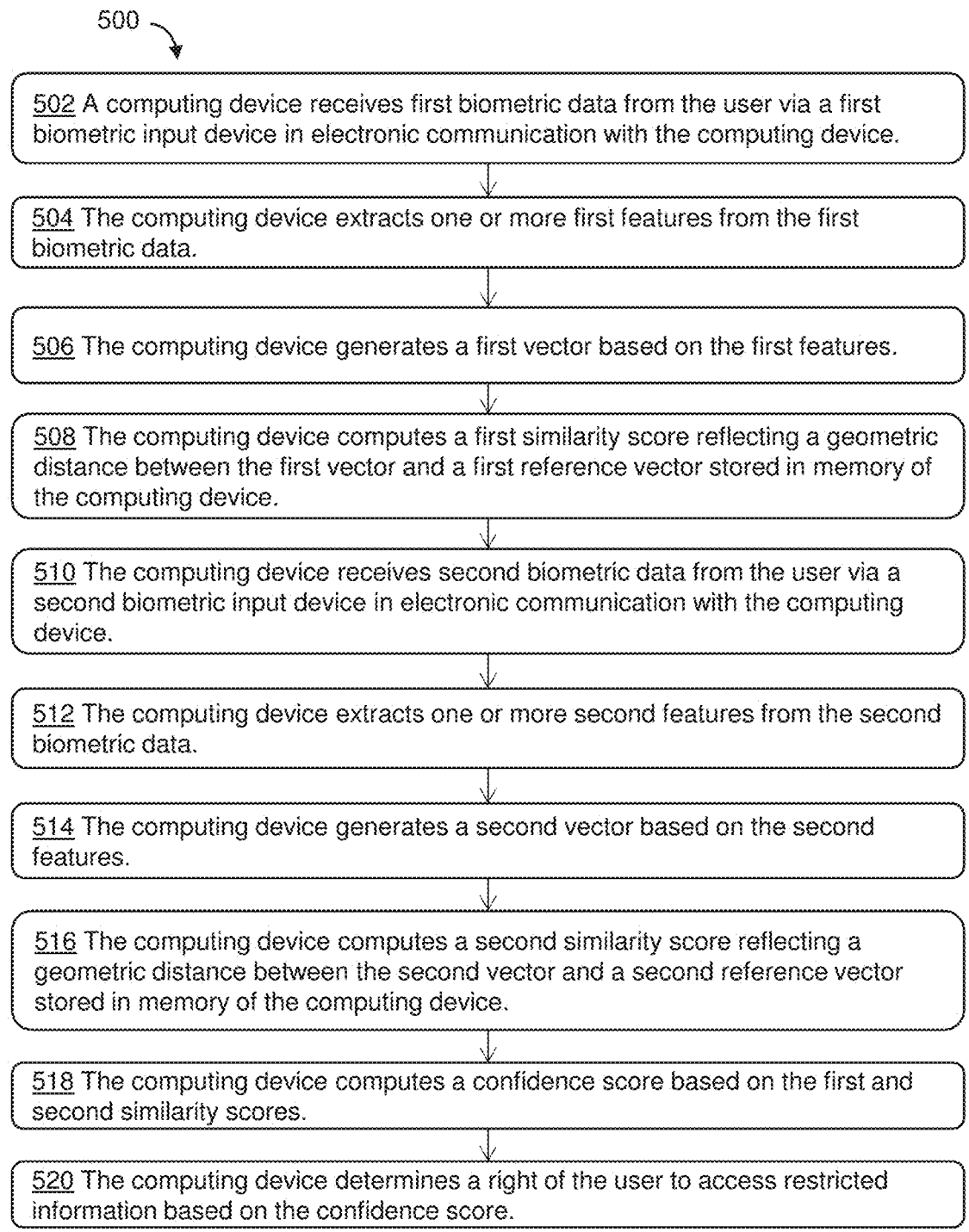
FIG. 5 is a flow diagram showing a computerized method for authenticating a user, according to an illustrative embodiment of the invention.

Step 3: The user begins a new session with the voice application. The following commands may be used:
startNewSession(request)
    session=generaleNewSession ( )
    userID=request.getUserId( )
    storeUserIDInSession(userID)
Step 4: The identity manager populates the request with the userID. The identity manager intercepts the request from the device to the voice application and populates it with the userID based on the voice and visual artifacts. The following commands may be used: populatcRcqucstWithUscrldfrcqucst. audio, visual)
    deviceID=request.geltDeviceID( )
    uscrProfileID=request.getUscrProfilcID( )
    applicationID=request.getApplicationID( )
    isAllowedToShare=checkIfUserGavePermissionToSharefdeviceID, userProfileID, applicationID)
    if (isAllowedToShare)
    faceProfilcID=processlmage(visual)
    voiceProfilcID=proccssAudio(audio)
    if (voiceProfileID!=none and faceProfileID!=none)
        userid=lookupUser( voiceProfilcID, faceProfilcID)
        request.setUserId(userId)
    else
        request. sctUscrId(none)
Step 5: Voice application confirms the validity of the user on every subsequent transaction. On establishment of the session, every subsequent transaction is validated with the Identity Manager before fulfillment. The following commands may be used:
onIntent(request)
    userId=request.getUserId( )
    userIdFromSession=retrieveUserIDFromSession( )
    if(userIdFromSession< >userID)
    persistSession( )
    invalidateSession( )
    startNewSession( )
    else
    fulfillTheIntent(request)
Optionally, the fraud detection scheme through stress and threat analysis can operate as follows:
CheckStressAndThreat (deviceId, userProfileID)
audio=captureVoiceFromMic( )
audioProfile=getAudioProfile(audio)
face=captureVisualFromCamera( )
facialExpression=getExpression(face)
if facialExpression does not belongs to neutralFaceExpression ( ) or audioProfile not within neutralAudioSpectrum( )
    RaiseStressOrThreatAlert( )
Else
    Continue with transaction FIG. 5 is a flow diagram 500 showing a computerized method for authenticating a user, according to an illustrative embodiment of the invention. In a first step 502, a computing device receives first biometric data from the user via a first biometric input device in electronic communication with the computing device. In a second step 504, the computing device extracts one or more first features from the first biometric data. In a third step 506, the computing device generates a first vector based on the first features. In a fourth step 508, the computing device computes a first similarity score reflecting a geometric distance between the first vector and a first reference vector stored in memory of the computing device. In a fifth step 510, the computing device receives second biometric data from the user via a second biometric input device in electronic communication with the computing device. In a sixth step 512, the computing device extracts one or more second features from the second biometric data. In a seventh step 514, the computing device generates a second vector based on the second features. In an eighth step 516, the computing device computes a second similarity score reflecting a geometric distance between the second vector and a second reference vector stored in memory of the computing device. In a ninth step 518, the computing device computes a confidence score based on the first and second similarity scores. In a tenth step 520, the computing device determines a right of the user to access restricted information based on the confidence score.

Figure 6:
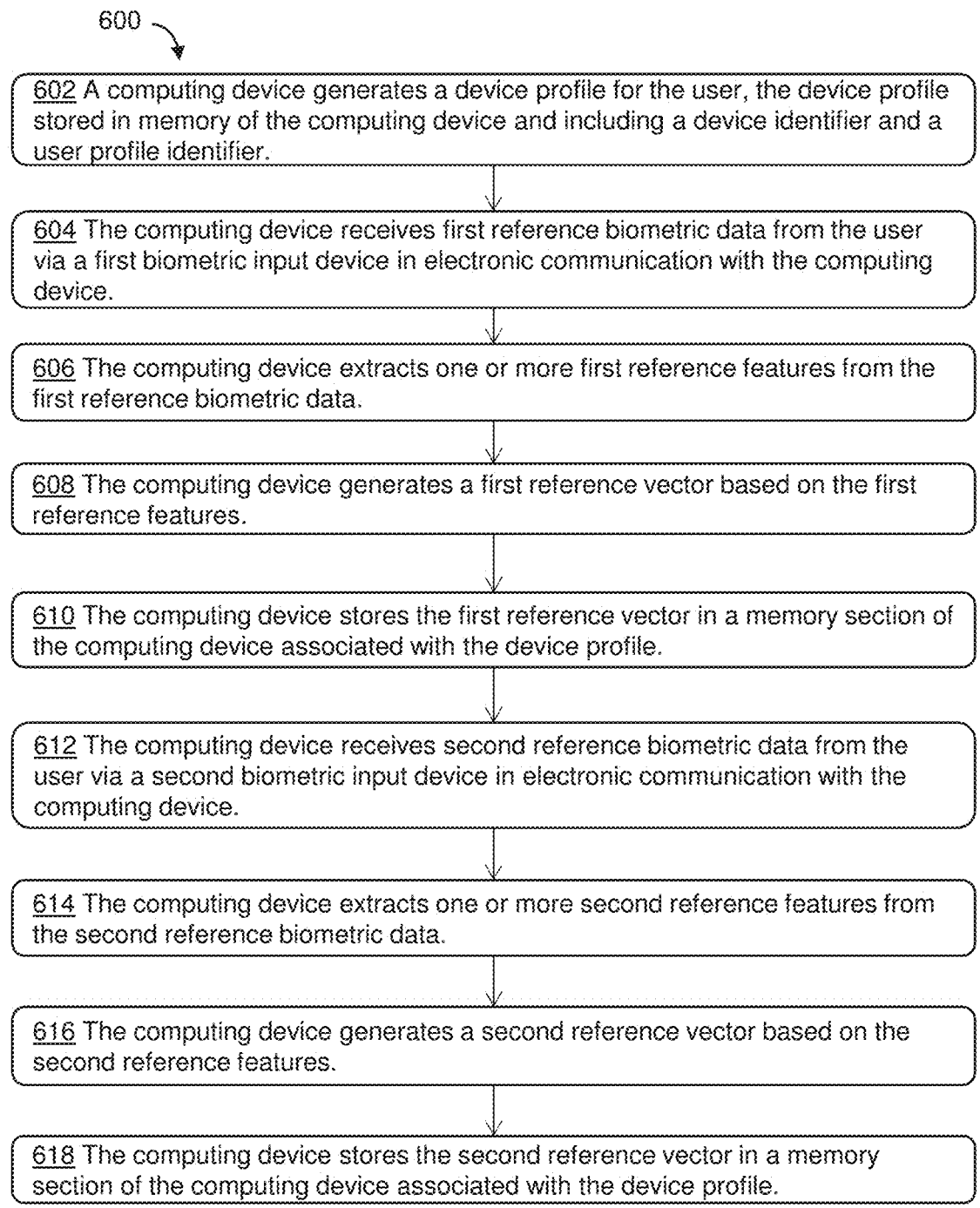
FIG. 6 is a flow diagram showing a computerized method for training a computing device to recognize a user, according to an illustrative embodiment of the invention.

FIG. 6 is a flow diagram 600 showing a computerized method for training a computing device to recognize a user, according to an illustrative embodiment of the invention. In a first step 602, a computing device generates a device profile for the user, the device profile stored in memory of the computing device and including a device identifier and a user profile identifier. In a second step 604, the computing device receives first reference biometric data from the user via a first biometric input device in electronic communication with the computing device. In a third step 606, the computing device extracts one or more first reference features from the first reference biometric data. In a fourth step 608, the computing device generates a first reference vector based on the first reference features. In a fifth step 610, the computing device stores the first reference vector in a memory section of the computing device associated with the device profile. In a sixth step 612, the computing device receives second reference biometric data from the user via a second biometric input device in electronic communication with the computing device. In a seventh step 614, the computing device extracts one or more second reference features from the second reference biometric data. In an eighth step 616, the computing device generates a second reference vector based on the second reference features. In a ninth step 618, the computing device stores the second reference vector in a memory section of the computing device associated with the device profile.

Figure 7:
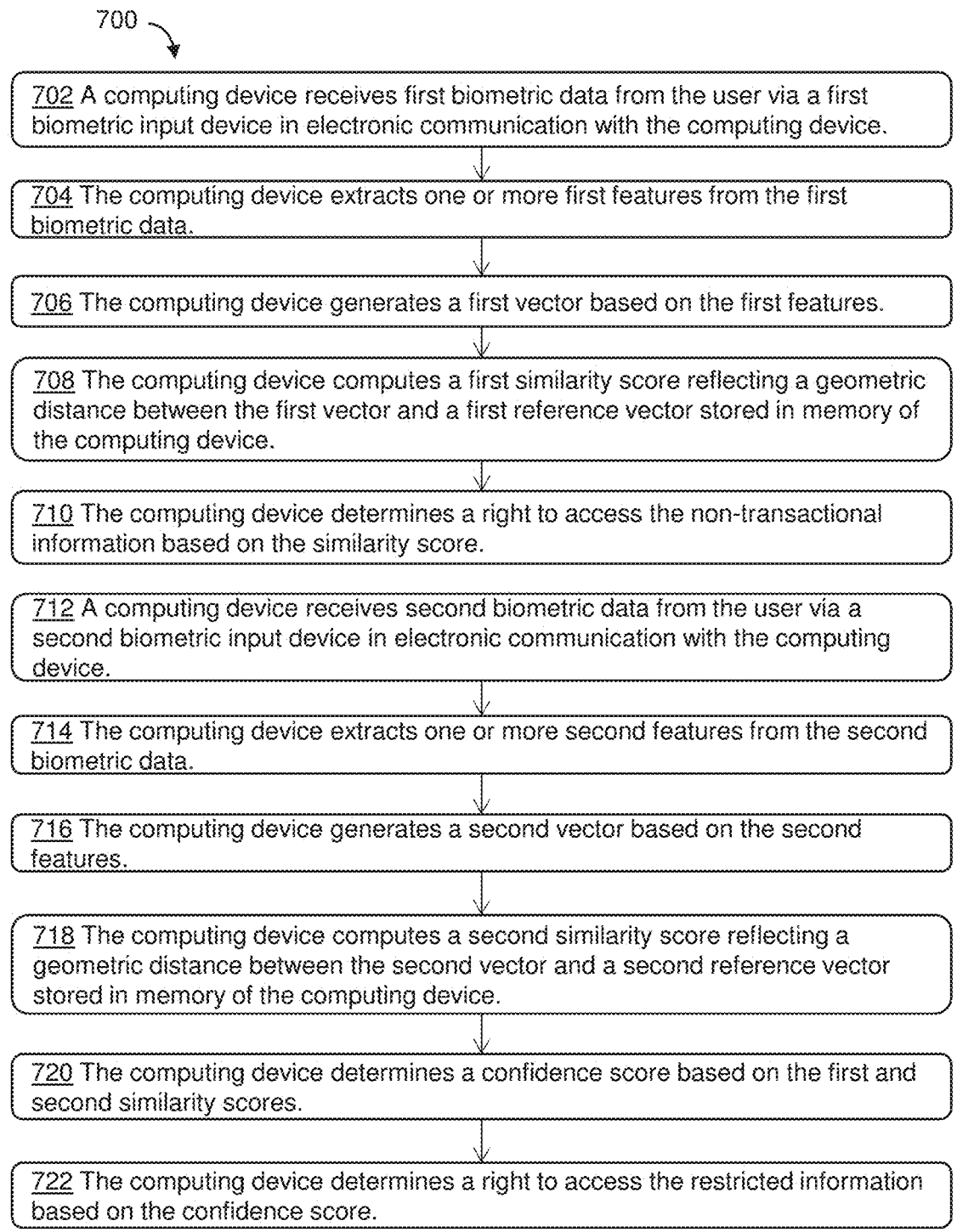
FIG. 7 is a flow diagram showing another computerized method for authenticating a user, according to an illustrative embodiment of the invention.

FIG. 7 is a flow diagram 700 showing another computerized method for authenticating a user, according to an illustrative embodiment of the invention. (I) Responsive to receiving a user request to access non-restricted information, a computing device: in a first step 702 receives first biometric data from the user via a first biometric input device in electronic communication with the computing device; in a second step 704 extracts one or more first features from the first biometric data; in a third step 706 generates a first vector based on the first features; in a fourth step 708 computes a first similarity score reflecting a geometric distance between the first vector and a first reference vector stored in memory of the computing device; in a fifth step 710 determines a right to access the non-transactional information based on the similarity score. (II) Responsive to receiving a user request to access restricted information, the computing device completes all of the steps of (I) and further: in a sixth step 712 receives second biometric data from the user via a second biometric input device in electronic communication with the computing device; in a seventh step 714 extracts one or more second features from the second biometric data; in an eighth step 716 generates a second vector based on the second features; in a ninth step 718 computes a second similarity score reflecting a geometric distance between the second vector and a second reference vector stored in memory of the computing device; in a tenth step 720 determines a confidence score based on the first and second similarity scores; and in an eleventh step 722 determines a right to access the restricted information based on the confidence score.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. The computer program can be deployed in a cloud computing environment (e.g., Amazon® AWS, Microsoft® Azure, IBM®). Method steps can be performed by one or more processors executing a computer program to perform functions of the invention by operating on input data and/or generating output data.

To provide for interaction with a user, the above described techniques can be implemented on a computing device in communication with a display device, e.g., a plasma or LCD (liquid crystal display) monitor or a mobile computing device display or screen for displaying information to the user and a keyboard and a pointing device, e.g., a mouse, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile computing device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

It should also be understood that various aspects and embodiments of the technology can be combined in various ways. Based on the teachings of this specification, a person of ordinary skill in the art can readily determine how to combine these various embodiments. In addition, modifications may occur to those skilled in the art upon reading the specification.

What is claimed is:

1. A computerized method of authenticating a user of a virtual assistant operating on a computing device, for each request made by the user during a computing session, the method comprising:

receiving, by the computing device, first biometric data from the user via a first biometric input device in electronic communication with the computing device;

extracting, by the computing device, one or more first features from the first biometric data;

generating, by the computing device, a first vector based on the first features;

computing, by the computing device, using a first neural network in electronic communication with the computing device, a first similarity score reflecting a geometric distance between the first vector and a first reference vector stored in memory of the computing device;

receiving, by the computing device, second biometric data from the user via a second biometric input device in electronic communication with the computing device;

extracting, by the computing device, one or more second features from the second biometric data;

generating, by the computing device, a second vector based on the second features;

computing, by the computing device, using a second neural network in electronic communication with the computing device, a second similarity score reflecting a geometric distance between the second vector and a second reference vector stored in memory of the computing device;

computing, by the computing device, using a third neural network in electronic communication with the computing device, a confidence score based on the first and second similarity scores; and determining, by the computing device, a right of the user to access restricted information based on the confidence score.

2. The method of claim 1 wherein the first biometric input device is a microphone configured to receive voice input from the user.

3. The method of claim 1 wherein the second biometric input device is a camera configured to receive facial image input from the user.

4. The method of claim 1 further including: monitoring, by the computing device, a stress indication of the user based on the first biometric data at one or more points in time; and denying, by the computing device, access to the restricted information if the stress indication exceeds a specified stress threshold.

5. The method of claim 4 wherein the monitoring occurs periodically or continuously throughout a user interaction.

6. The method of claim 1 further including monitoring, by the computing device, an emotional indication of the user based on the second biometric data at one or more points in time; and denying, by the computing device, access to the restricted information if the emotional indication exceeds a specified emotion threshold.

7. The method of claim 6 wherein the monitoring occurs periodically or continuously throughout user interaction.

8. The method of claim 1 wherein computing at least one of the first similarity score or the second similarity score includes using a supervised learning model.

9. The method of claim 1 wherein the first and second reference vectors are stored in a user profile, the user profile included in an identity manager module of the computing device that interfaces with the virtual assistant, the virtual assistant receiving a request from the user and a voice application for serving the request after the user is authenticated.

10. The method of claim 1 wherein during the computing session the computing device repeats the above steps, continuously or periodically, for newly received first and second biometric data of the user.

11. A computing system for authenticating a user of a virtual assistant operating on a computing device, for each request made by the user during a computing session, the computing system comprising:
the computing device having a processor and a memory;
a first biometric input device in electronic communication with the computing device; and
a second biometric input device in electronic communication with the computing device;
wherein the computing device is configured to: receive first biometric data from the user via the first biometric input device; extract one or more first features from the first biometric data; generate a first vector based on the first features; compute, using a first neural network in electronic communication with the computing device, a first similarity score reflecting a geometric distance between the first vector and a first reference vector stored in the memory of the computing device; receive second biometric data from the user via the second biometric input device; extract one or more second features from the second biometric data; generate a second vector based on the second features; compute, using a second neural network in electronic communication with the computing device, a second similarity score reflecting a geometric distance between the second vector and a second reference vector stored in memory of the computing device; compute, using a third neural network in electronic communication with the computing device, a confidence score based on the first and second similarity scores; and determine a right of the user to access restricted information based on the confidence score.

12. The computing system of claim 11 wherein the first biometric input device is a microphone and the second biometric input device is a camera.

13. The computing system of claim 11 wherein the computing device is one of a smartphone, tablet, or personal computer.

14. The computing system of claim 11 wherein during the computing session the computing device is configured to repeat the above steps, continuously or periodically, for newly received first and second biometric data of the user.

15. A computerized method of training a computing device to recognize a user of a virtual assistant operating on the computing device, for each request made by the user during a computing session, the method comprising:
generating, by the computing device, a device profile for the user, the device profile stored in memory of the computing device and including a device identifier and a user profile identifier;
receiving; by a computing device, first reference biometric data from the user via a first biometric input device in electronic communication with the computing device;
extracting, by the computing device, one or more first reference features from the first reference biometric data;
generating; by the computing device; a first reference vector based on the first reference features;
storing, by the computing device, the first reference vector in a memory section of the computing device associated with the device profile, the first reference vector usable for computation, using a first neural network, of a first similarity score between the first reference vector and a first vector generated based on first biometric data obtained from the user during a computing session;
receiving, by the computing device, second reference biometric data from the user via a second biometric input device in electronic communication with the computing device;
extracting, by the computing device, one or more second reference features from the second reference biometric data;
generating, by the computing device, a second reference vector based on the second reference features; and
storing, by the computing device, the second reference vector in a memory section of the computing device associated with the device profile, the second reference vector usable for computation, using a second neural network, of a second similarity score between the second reference vector and a second vector generated based on second biometric data obtained from the user during the computing session,
wherein the first and second similarity scores are usable by a third neural network in electronic communication with the computing device to compute a confidence score based on the first and second similarity scores.

16. The method of claim 15 wherein the first reference biometric data includes one or more pass phrases or answers to secret questions spoken by the user.

17. The method of claim 16 wherein the first reference features include Cepstral, Cepstral-extended, phonetics, and prosodic features based on a frequency domain translation of the first reference biometric data.

18. The method of claim 17 wherein the first reference vector is generated using a dynamic time warping encoding model or a Gaussian mixture model.

19. The method of claim 15 wherein the second reference biometric data includes one or more facial images of the user.

20. The method of claim 19 wherein the second reference features include numerical values based on facial attributes.

21. The method of claim 20 wherein the second reference vector is generated using a deep neural network.

22. The method of claim 15 wherein during the computing session the computing device repeats the above steps, continuously or periodically, for newly received first and second biometric data of the user.

23. A computerized method of authenticating a user of a virtual assistant operating on a computing device, comprising:
   (i) responsive to receiving a user request to access non-restricted information:
   receiving, by the computing device, first biometric data from the user via a first biometric input device in electronic communication with the computing device;
   extracting, by the computing device, one or more first features from the first biometric data;
   generating, by the computing device, a first vector based on the first features;
   computing, by the computing device, using a first neural network in electronic communication with the computing device, a first similarity score reflecting a geometric distance between the first vector and a first reference vector stored in memory of the computing device; and
   determining, by the computing device, a right to access the non-transactional information based on the similarity score; and
   (ii) responsive to receiving a user request to access restricted information, completing all of the steps of (i) and further:
   receiving, by the computing device, second biometric data from the user via a second biometric input device in electronic communication with the computing device;
   extracting, by the computing device, one or more second features from the second biometric data;
   generating, by the computing device, a second vector based on the second features;
   computing, by the computing device, using a second neural network in electronic communication with the computing device, a second similarity score reflecting a geometric distance between the second vector and a second reference vector stored in memory of the computing device;
   determining, by the computing device, using a third neural network in electronic communication with the computing device, a confidence score based on the first and second similarity scores; and
   determining, by the computing device, a right to access the restricted information based on the confidence score.

24. The method of claim 23 wherein, responsive to receiving a user request to access non-restricted information, the computing device determines a category of the user without determining a precise identity of the user.

25. The method of claim 23 wherein during the computing session the computing device repeats the above steps, continuously or periodically, for newly received first and second biometric data of the user.

* * * * *